Sept. 6, 1932.  J. HOFMANN  1,876,004

SNUBBER OR SHOCK ABSORBER

Filed Feb. 14, 1929   2 Sheets-Sheet 1

INVENTOR.
Josef Hofmann
BY
ATTORNEY.

Patented Sept. 6, 1932

1,876,004

UNITED STATES PATENT OFFICE

JOSEF HOFMANN, OF MERION, PENNSYLVANIA

SNUBBER OR SHOCK ABSORBER

Application filed February 14, 1929. Serial No. 339,845.

My invention relates to snubbers or shock absorbers operating hydraulically, employing either one or a plurality, preferably two, oscillating or reciprocating pistons. The piston, or pistons, co-act with a stationary passage or passages for permitting for a limited time during the movement of the piston or pistons the transfer of liquid, preferably oil, from one side of the piston or pistons to the other. In other words, a piston cooperates with its pertaining passage for but a portion of its maximum stroke or oscillation.

In each piston there is a single throttling and suction valve that can pass through an opening in the piston. This valve is spring-controlled, and is balanced in its normal position by these springs, which counteract.

Details of construction will hereafter be described and specifically claimed.

Figure 1:
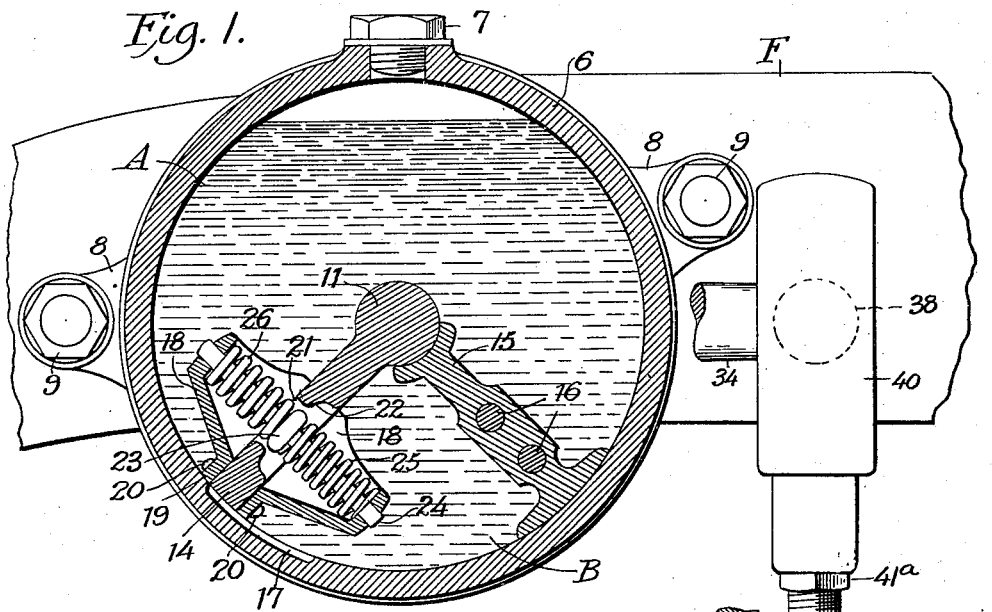
Figure 1 is a vertical section of a single piston device embodying my invention.
Figure 2:
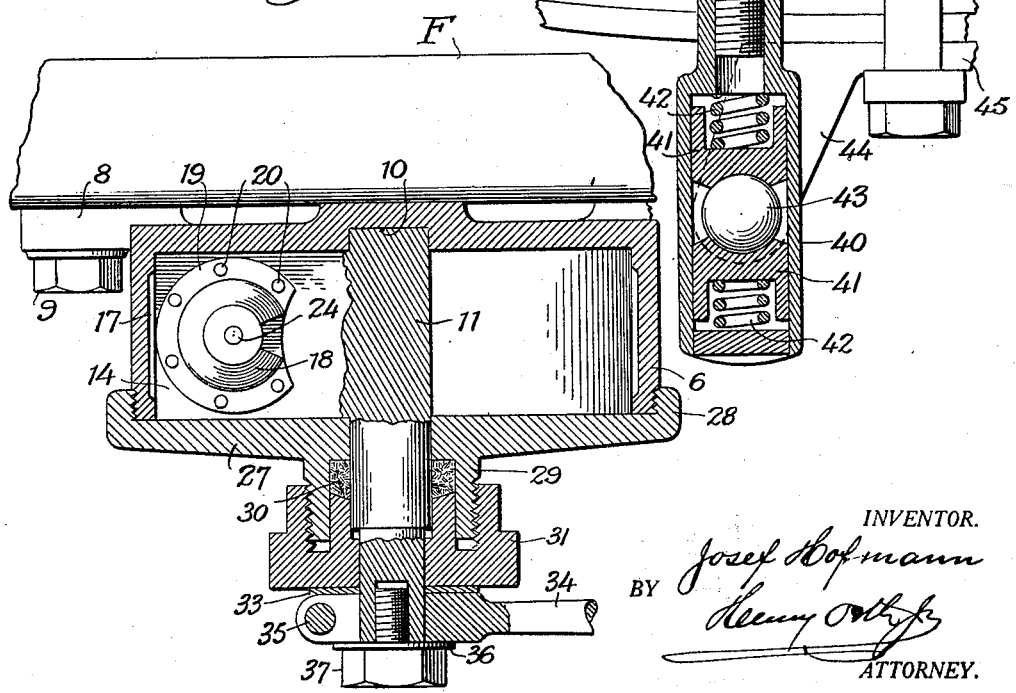
Fig. 2 is a view of Fig. 1, partly in cross-section and partly in elevation.

Referring to Figures 1 and 2, the cylinder or casing 6 has a filling opening for oil at the top, closed by a screw plug 7, and is provided with ears 8 through which pass bolts or other fastening means 9 by which the snubber is secured to a vehicle frame member F. The cylinder has a central recess or seat 10 in which rotates one end of a shaft 11. A radial piston 14 is welded or otherwise secured to the shaft 11 so that the piston and shaft oscillate as a unit.

A radial partition or abutment 15 is secured to the cylinder by screws or other fastening. This abutment 15 fits substantially fluid-tight between the shaft 11 and inner cylinder wall, though a small amount of leakage past its edges will not destroy the operativeness of the snubber or shock absorber. The piston 14 and abutment 15 divide the cylinder into two variable chambers A and B.

The free end of the piston 14 fits against the circular wall of the cylinder 6 and co-operates with a transfer or by-pass passage 17 of small arcuate length. The piston has on each side a spring housing 18 having a circular flange 19 through which, and the piston, rivets 20 are passed to hold the two housings securely to the opposite faces of the piston.

Within the housings the piston has a port 21 having rounded edges and constituting a flow constriction between the chambers A and B of the casing and on one side of the piston this port is surrounded by a countersink or recess 22, also having rounded edges for the easy flow of the oil through the port. At the port but normally slightly toward the countersunk side thereof is located a two-way valve 23 mounted to slide on a rod 24 that supports coil springs 25 and 26 one on each side of the valve. These springs hold the valve in or at the port when the snubber is in its inoperative position. These springs are under but slight compression.

Of course, it is obvious that the valve 23 may be rigid with rod 24 and the rod and valve move as a unit, as the operation will be quite the same. The valve 23 in operation is free to move through the port to one side or the other of the radial piston 14. It is apparent that the first part of a movement of the valve 23 in a clockwise direction relative to port 21 brings the valve within the port and diminishes the flow area from one side of the piston to the other through the port, whereas the movement of the valve in the counterclockwise direction immediately enlarges the flow area through the port.

In this construction I have shown the springs 25 and 26 made of spring wire of different diameters, the one 26 being the heavier wire, but both springs exert the same pressure on the valve 23 to hold it in its normal position, the lighter spring, however, yielding more readily under pressure.

The cylinder 6 is closed by a cover 27 having a marginal flange 28 that screws onto the exterior of the open end of the cylinder and is provided with a central, externally threaded, tubular boss 29 around the projecting end of the shaft. Packing material 30 is placed between the boss and the shaft and compressed by a suitable nut 31.

A metallic washer 33 may or may not be placed between the nut 31 and the split end of the operating lever 34 which is clamped to the end of the shaft 11 that projects through the cover, by a screw bolt 35. A washer 36 and a screw 37 passing therethrough holds the lever in place, and presses arm 34 against the metal washer 33. The other end of the lever 34 has a ball 38 that engages the upper end of the operating rod 39 provided with upper and lower anti-rattling heads 40. The ends of the rod 39 are screw-threaded and screw into these heads, being held by jam-nuts 41ª, thus permitting adjustment of the effective length of the rods 39.

These heads 40 are cylinders having ball-engaging bushings 41 pressed against the balls by heavy springs 42. In the lower head is mounted a ball 43 fixed on a bracket 44 of a plate 45 that lies beneath one of the main vehicle springs 46 and is held with this spring to the spring seat by the customary spring stirrups 47.

The casing 6 is preferably nearly full of oil.

In Fig. 1 the piston 14 of the single acting snubber and buffer device is shown as closing the by-pass or transfer passage 17, and in its normal position. When the piston is moved from this normal position in a clockwise direction, the valve 23 opens by suction against the action of the coil spring 25, and the liquid passes quite freely from chamber A into chamber B through the port 21. Upon the return, or counter clock-wise movement of the piston back to normal position, liquid trapped in the compression chamber B is forced through port 21 back into chamber A by forcing the valve 23 through the port against the action of spring 26.

By reason of the valve 23 being arranged on one side of the constriction of port 21 in its normal position, and having to be forced entirely through this port before the liquid in chamber B can pass into chamber A, the coil spring 26 is strongly compressed, offering considerable resistance to the passage of the liquid through the port, while the other spring 25 is correspondingly de-compressed, thus this combined action on the valve of both springs causes a strong throttling action on the liquid, producing a strong snubbing action, until the piston begins to open the by-pass 17. After the piston 14 opens the by-pass port 17 the piston has free movement until it closes this by-pass when a buffer-like effect sets in, by reason of the liquid in chamber B having again to act against valve 23 and spring 26 to open the port 21.

The piston 14 then moves back to normal position clock-wise, valve 23 opening under the suction action in chamber B, to allow oil to freely pass the port 21, and thereafter opening the by-pass port 17 for its travel to normal position.

It will be noted that the valve 23 offers very little resistance to the movement of the piston when moving upwardly from the position shown in Figure 1, because the valve is at the lower side of the port and has but a small distance to move to fully open the port, but when the piston moves downward the compression on valve 23 is increased because of the greater extent of movement of valve 23 against the action of spring 26 in passing through its port.

The cycle is then repeated.

Figure 3:
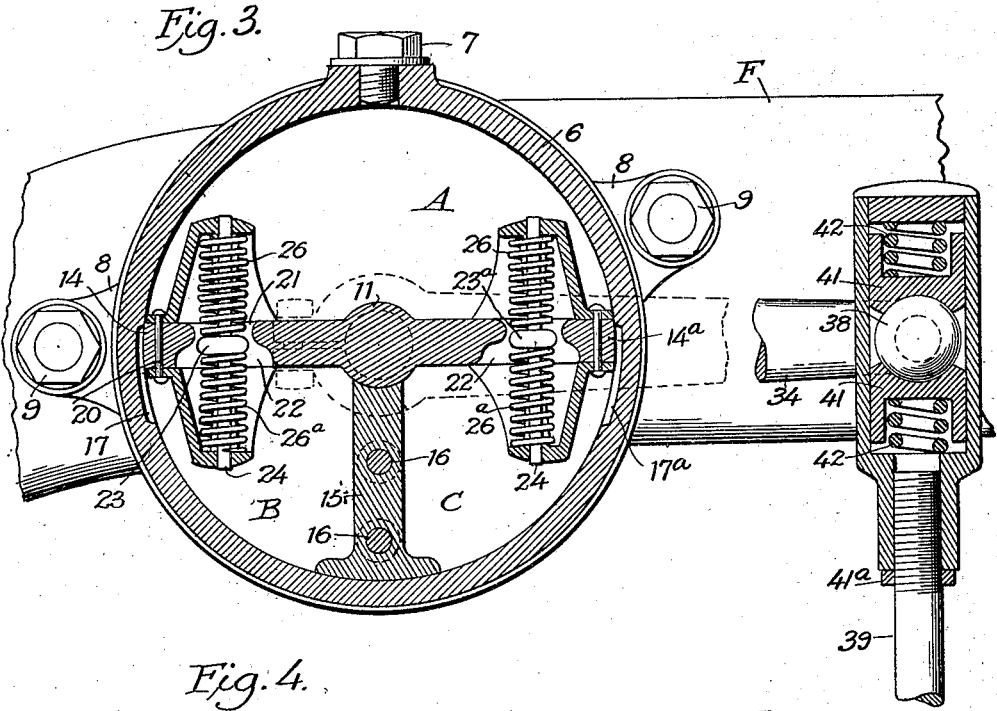
Fig. 3 is a vertical section of a two-piston construction, similar to Figure 1.
Figure 4:
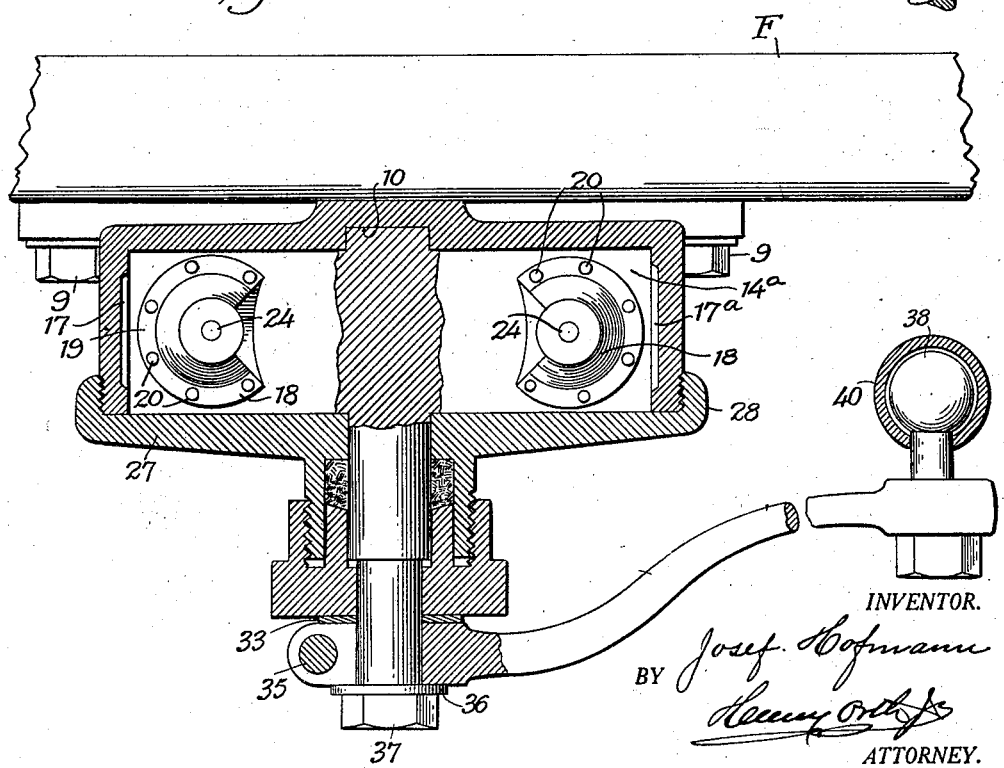
Fig. 4 is a section thereof, similar to Figure 2.

Figures 3 and 4 show two pistons, 14 and 14ª, symmetrical with the abutment 15, and the cylinder is provided with two by-pass or transfer passages 17 and 17ª forming flow constrictions, thus forming a double-acting snubber and buffing device. In this case there are three chambers, A, B and C.

The two pistons, 14 and 14ª, when moved from the normal position shown in a clockwise direction, permit free movement of the piston 14ª by allowing the liquid to pass through the by-pass 17ª from chamber C into chamber A. At the same time, the valve 23 in piston 14 acting as a suction valve, will open to allow liquid to pass freely from chamber A into chamber B. On the return, or counter-clockwise movement back to normal position, the piston 14ª will move freely within the range of the by-pass 17ª, while, on the other hand, piston 14 having passed its by-pass port 17, its valve 23 will be forced through its port 21 to strongly compress its spring, with the same action as already described in the single-acting type, Fig. 1. It is obvious that, since valve 23 is normally positioned on one side of the constriction of port 21, movement of the valve a certain distance in a counterclockwise direction relative to the port causes a greater flow area between chambers A and B than an equal movement in of the valve a clockwise direction.

Upon movement of the pistons from their normal position anti-clockwise, the piston 14 is free to move within the range of its by-pass 17. The piston 14ª, however, moves away from its by-pass 17ª, and its valve 23ª will open quite freely, as explained with respect to valve 23, to allow liquid from chamber A to pass into chamber C. On clock-wise movement of piston 14ª back to normal position, its valve 23ª and spring 26 will offer resistance to the passage of liquid from chamber C into chamber A, thus producing the desired snubbing effect, while the other piston 14 is free to move over the range of its by-pass 17.

In case either piston 14 or 14ª passes the lower end of its by-pass, 17 or 17ª, the buffer effect as previously described with respect to Fig. 1, sets in.

In this form I have shown the by-pass valves 23 and 23ª integral with their supporting rods 24; in other respects the parts are like those shown in Figs. 1 and 2. The springs 26 and 26ᵃ in Fig. 3 are illustrated as made of the same size of wire, but this is not necessary, as said springs may be made of wire of different sizes, as shown in Figure 1.

I claim—

1. In a snubber, a casing, a by-pass for the casing, an abutment in the casing, a piston member, said abutment and member dividing the casing into chambers and said member controlling the by-pass and provided with a port therethrough, a valve arranged to pass entirely through the port and means to mount said valve to cause different throttling pressures in one direction of movement of the member than in the other direction.

2. In a snubber, a casing, a by-pass in the casing, an abutment in the casing, a piston member in the casing, said abutment and member dividing the casing into chambers, said member controlling the by-pass, said member having a port communicating said chambers and providing a part of a flow constriction between the chambers, a valve arranged to pass entirely through said port and means to resiliently mount said valve adjacent the port to one side of the constriction whereby a different throttling effect is obtained in one direction of movement of the member than in the other direction.

3. In a snubber, a cylindrical casing, an abutment in the casing, a piston pivotally mounted at the axis of the casing and extending entirely across the casing, the casing having a pair of by-passes in its wall at one side of the member, each of said by-passes being controlled by an end of said member, said member being provided with a pair of ports, one on each side of the axis, each of said ports providing a flow constriction, a valve for each port arranged to pass entirely through its port and means for resiliently mounting said valves adjacent the ports to one side of the constriction, said valves being normally on the same side of the constrictions as the by-passes.

In testimony that I claim the foregoing as my invention, I have signed my name hereto.

JOSEF HOFMANN.